United States Patent
Linnert et al.

(10) Patent No.: US 11,313,708 B2
(45) Date of Patent: Apr. 26, 2022

(54) METHOD FOR OPERATING A MAGNETIC INDUCTIVE FLOWMETER AND MAGNETIC INDUCTIVE FLOWMETER

(71) Applicant: Endress+Hauser Flowtec AG, Reinach (CH)

(72) Inventors: Michael Linnert, Zirndorf (DE); Simon Mariager, Basel (CH)

(73) Assignee: ENDRESS+HAUSER FLOWTEC AG, Reinach (CH)

(*) Notice: Subject to any disclaimer, the term of this patent is extended or adjusted under 35 U.S.C. 154(b) by 198 days.

(21) Appl. No.: 16/954,028

(22) PCT Filed: Nov. 14, 2018

(86) PCT No.: PCT/EP2018/081141
§ 371 (c)(1),
(2) Date: Jun. 15, 2020

(87) PCT Pub. No.: WO2019/115115
PCT Pub. Date: Jun. 20, 2019

(65) Prior Publication Data
US 2021/0164815 A1   Jun. 3, 2021

(30) Foreign Application Priority Data
Dec. 14, 2017 (DE) .................... 10 2017 129 980.7

(51) Int. Cl.
*G01F 1/60* (2006.01)
*G01F 1/58* (2006.01)
(52) U.S. Cl.
CPC ............... *G01F 1/60* (2013.01); *G01F 1/588* (2013.01)
(58) Field of Classification Search
None
See application file for complete search history.

(56) References Cited

U.S. PATENT DOCUMENTS

| 4,382,387 A | 5/1983 | Hafner |
| 4,422,337 A | 12/1983 | Hafner |
| 4,597,295 A | 7/1986 | Goto et al. |

FOREIGN PATENT DOCUMENTS

| CN | 85105476 A | 1/1987 |
| CN | 1816734 A | 8/2006 |

(Continued)

OTHER PUBLICATIONS

Huang, Xiao Guant, Yue, Shi Hong, Zhang, Hao, Sun, Ben Yuan, The Prediction of Energy-Saving Electromagnetic Flowmeter Based on Kalman Filtering Method, Proceedings of 2015 IEEE International Conference on Applied Superconductivity and Electromagnetic Devices, Nov. 20-23, 2015, 1 p. (262).

*Primary Examiner* — Harshad R Patel
(74) *Attorney, Agent, or Firm* — Christopher R. Powers; Endress+Hauser(USA) Holding, Inc.

(57) ABSTRACT

The present disclosure relates to a method for operating a magnetoinductive flowmeter in which, during a constant phase having a constant magnetic field, a plurality of raw measured values of the raw measurement voltage are determined, the raw measurement voltage including a flow-dependent component, an interference component and a noise component, wherein each raw measured value assigned a flow measured value and an interference voltage value, wherein a raw measured value from a preceding first constant phase and a raw measured value from a second constant phase following the first constant phase are used to calculate a second flow measured value and a second interference voltage value of the interference component, wherein first flow measured values from the first constant phase and/or second constant phase are corrected using the knowledge of the second flow measured value and the calculated second interference voltage value.

17 Claims, 7 Drawing Sheets

(56) References Cited

FOREIGN PATENT DOCUMENTS

| | | |
|---|---|---|
| CN | 101657699 A | 2/2010 |
| CN | 104995489 A | 10/2015 |
| CN | 106979804 A | 7/2017 |
| DE | 10329540 A1 | 2/2005 |
| DE | 102005033290 A1 | 1/2007 |
| DE | I02005033290 A1 | 1/2007 |
| EP | 1275940 A2 | 1/2003 |
| WO | 2015043746 A1 | 4/2015 |
| WO | 2018114189 A1 | 6/2018 |

METHOD FOR OPERATING A MAGNETIC INDUCTIVE FLOWMETER AND MAGNETIC INDUCTIVE FLOWMETER

CROSS-REFERENCE TO RELATED APPLICATIONS

The present application is related to and claims the priority benefit of German Patent Application No. 10 2017 129 980.7, filed on Dec. 14, 2017, and International Patent Application No. PCT/EP2018/081141, filed on Nov. 14, 2018, the entire contents of which are incorporated herein by reference.

TECHNICAL FIELD

The invention relates to an energy-saving method for operating a magnetic inductive flow meter for measuring a flow rate or a volumetric flow of a medium flowing through a measuring tube of the flow meter and to such a flow meter.

BACKGROUND

Magnetic inductive flow meters make use of the fact that magnetic fields deflect electrically charged particles which have a velocity component perpendicular to the magnetic field perpendicularly to the magnetic field, the direction of the deflection being dependent on the sign of the charge.

In an electrically conductive medium flowing through a measuring tube of a magnetic inductive flow meter, an electric measurement voltage is induced by a magnetic field extending perpendicularly to a measuring tube axis and can be tapped by means of measuring electrodes and evaluated for a flow measurement.

Ideally, the voltage tapped by the measuring electrodes is proportional to the strength of the magnetic field and proportional to the flow of the medium through the measuring tube. However, electrochemical effects, for example on a medium-measuring electrode surface, cause interference potentials, which can vary over time and distort a flow measurement.

This shortcoming is countered, for example, by establishing measuring phases during which the medium is subjected to a constant magnetic field over time, wherein measuring phases are interrupted by alternating phases, which are established for alternating the field strength and optionally the direction of the magnetic field. By tapping measurement voltages from different measuring phases and forming the difference, the influence of the interference potentials and, consequently, corrected flow measurement values can be determined. As a result, the magnetic field must be changed for each flow measurement and for each interference voltage determination.

Another procedure for determining and correcting the interference voltage is disclosed, for example, in WO 2015043746 A1, the technical background being energy-saving magnetic inductive flow meters having a low switching frequency. A first magnetic field having a first magnetic field strength is used to establish a second magnetic field having a second magnetic field strength and a directly following third magnetic field having a third magnetic field strength, wherein exactly one measurement value of a measurement voltage is determined in each of the first and second magnetic fields, two further measurement values of the measurement voltages are determined in the third magnetic field, and a flow measurement corrected by means of a specific interference voltage is not obtained until the fourth measurement voltage.

The disadvantage of this solution is the long phase during the two first magnetic fields, during which no flow measurement is carried out.

SUMMARY

The object is therefore to propose a method for operating a magnetic inductive flow meter and a magnetic inductive flow meter, so that little energy is needed for operating the flow meter and more measuring time is available.

The object is achieved by a method and by a magnetic inductive flow meter according to the present disclosure.

In a method according to the invention for operating a magnetic inductive flow meter for measuring the volumetric flow or the flow rate of a medium flowing through a measuring tube of the flow meter, a magnet system applies a magnetic field that is perpendicular to a measuring tube axis to the medium in the measuring tube, a magnetic field curve having constant phases K having a constant magnetic field over time, and alternating phases W having a variable magnetic field over time, the alternating phases being configured to change from a first constant phase having a first magnetic field into a subsequent second constant phase having a second magnetic field, the second magnetic field being dissimilar from the first magnetic field;

a flow-dependent electric raw measurement voltage R(t) induced in the medium being tapped by means of at least one pair of measuring electrodes, comprising a first measuring electrode and a second measuring electrode;

an electronic measuring/operating circuit, which evaluates the raw measurement voltage and determines flow measurement values, being electrically connected to the measuring electrodes, wherein:

a plurality of raw measurement values RM(t) of the raw measurement voltage are determined during each constant phase, the raw measurement voltage R being composed of a flow-dependent component D, an interference component S and a noise component, a first flow measurement value D1 and a first interference voltage value S1 being calculated from each raw measurement value RM(t), a raw measurement value of a preceding first constant phase and a raw measurement value of a second constant phase following the first constant phase being used to calculate a second flow measurement value and a second interference voltage value Sb of the interference component S, first flow measurement values of the first constant phase and/or of the second constant phase being adapted by means of the knowledge of the second flow measurement value and the calculated second interference voltage value.

The adaptation can take place, for example, by way of a mathematical model.

By detecting a plurality of raw measurement voltages and calculating a plurality of first flow measurement values during a constant phase, while carrying out the occasional adaptation or correction by means of second flow measurement values, a change frequency from a constant phase to a subsequent constant phase, and thus the associated change of the magnetic field, can be low. Individual constant phases can thus comprise durations of at least 0.5 seconds or, especially, at least 2 seconds or preferably at least 10 seconds. Typical durations of alternating phases are less than 25 milliseconds. This results in an especially advantageous ratio of the duration of a constant phase to a duration of an alternating phase of at least 20.

The terms "first constant phase" and "second constant phase" denote any two constant phases that follow one another.

In one embodiment of the method, a subsequent forecast value of the flow rate is predicted based on a first flow measurement value, and a subsequent forecast value of the interference component is predicted based on a first interference voltage value, a further raw measurement value being measured, a first flow measurement value being calculated by means of the forecast value of the flow and by means of the further raw measurement value, and a first interference voltage value being calculated by means of the forecast value of the interference voltage and by means of the further raw measurement value, the procedure being repeated for determining further first flow measurement values and further first interference voltage values.

By calculating a next flow value or interference voltage value proceeding from corresponding preceding values by means of a forecast flow value or interference voltage value and a raw measurement value, the flow rate can be determined with a required accuracy with little computing effort. This is an important aspect, especially, for field devices used in measuring and automation technology, and thus for magnetic inductive flow meters.

Predicting a forecast value for the flow is based on the determination of a rate of change. In addition to the rate of change, higher temporal derivatives can also be determined, which can be used for the calculation of further subsequent forecast values.

Predicting a forecast value may also be based on linear or quadratic continuation, or, especially, a Taylor expansion.

In one embodiment of the method, weighting of the forecast values of the flow as well as of the interference voltage and the raw measurement value is flow-dependent.

For example, uncertainty of the raw measurement value may be flow-dependent, in which case the weighting thereof may be adapted.

In one embodiment of the method, a first variance is assigned to the forecast value of the flow, a second variance being assigned to the forecast value of the interference voltage, and a third variance being assigned to the raw measurement value, a weighting of the respective forecast value and of the raw measurement value being carried out based on the associated variances when calculating the first flow measurement value or the first interference voltage value.

In one embodiment of the method, an estimation of the variances is based on a difference between the corresponding forecast value and the raw measurement value or a signal-to-noise ratio.

In one embodiment of the method, Kalman filtering is used during the calculation of the forecast value and the calculation of the subsequent flow value and of the subsequent interference voltage value.

The adaptation of first flow measurement values to second flow measurement values can be carried out, for example, by varying parameters of the Kalman filter.

In one embodiment of the method, an alternating phase is initiated when at least one of the following criteria occurs:

the first variance exceeds a first threshold;

the second variance exceeds a second threshold; and the third variance exceeds a third threshold; and a deviation of a forecast interference component from an interference voltage value exceeds a fourth threshold value.

The durations of different constant phases can thus be of different lengths and adapted to boundary conditions.

In one embodiment of the method, at least two flow-dependent electric raw measurement voltages (R) induced in the medium are tapped, the curves of the raw measurement voltages being compared, a corresponding change in the measurement voltage being interpreted as interference when a raw measurement voltage curve changes in the absence of a corresponding change in the respective at least one other raw measurement voltage curve, a change in the raw measurement voltage being interpreted as a change in flow in the case of uniform raw measurement voltage curves.

Uniformity between two voltage curves exists, for example, when the voltage curves can be superimposed by multiplying the amplitudes of a voltage curve by a constant factor and/or by shifting the one voltage curve by a constant value. For example, in order to detect a quality of the uniformity, a correlation between the two voltage curves can be determined.

In one embodiment of the method, the comparison of the raw measurement voltages is carried out based on the raw measurement voltages or first flow measurement values derived therefrom or second flow measurement values and/or first interference voltage values or second interference voltage values.

In one embodiment of the method, a first comparison voltage between the first measuring electrode and ground and a second comparison voltage between the second measuring electrode and ground are tapped by means of a ground, the ground being, for example, a ground electrode or a pipe connected to the measuring tube or a grounding disk, and/or a flow-dependent electric raw measurement voltage being tapped by means of at least two pairs of measuring electrodes.

In this way, it can be identified whether a change in the tapped raw measurement voltage is attributable to a change in flow or a change in interference voltage.

The different pairs of measuring electrodes can be arranged offset relative to one another along the measuring tube axis or in a cross section.

In one embodiment of the method, a constant phase comprises a determination of at least 2, and, especially, at least 10, and preferably at least 50 raw measurement values. However, a constant phase can also comprise up to 1000000 raw measurement values.

In one embodiment of the method, a raw measurement value is calculated from averaging a plurality of tapped raw measurement voltages, wherein averaging comprises at least 2 and, especially, at least 5, and preferably at least 10, and no more than 100 and/or, especially, no more than 50 and preferably no more than 20 tapped raw measurement voltages.

In the case of electronic measuring/operating circuits having low computing power, such averaging can constitute a relief, without excessively limiting the accuracy of the measurement voltage curve to be calculated.

In one embodiment of the method, the magnetic field is at least partially generated by at least one remanence magnet during the constant phases, a remanent field of the remanence magnet being changed and, especially, the polarity thereof being reversed, during the alternating phases by means of a coil system comprising at least one coil, or a magnetic field being generated at least partially by at least one permanent magnet and at least partially by a coil system comprising at least one coil during the constant phases, the magnetic field being changed during the alternating phases by changing the magnetic field component generated by the coil system, or the magnetic field being generated by a coil system comprising at least one coil.

When using at least one remanence magnet, the energy required for operating a magnet system is limited to the occasional change of a remanent magnetic field of a magnetic material, which means, especially, a polarity reversal of the remanent magnetic field. A change in the remanent magnetic field is brought about by applying a sufficiently strong magnetic field pulse, for example generated by means of a coil, to the remanence magnet. In the case of sufficiently long constant phases, energy can thus be saved in comparison with a magnet system in which a magnetic field is generated exclusively by coils.

Alternatively, instead of the at least one remanence magnet, at least one permanent magnet may be used to at least partially generate a magnetic field. For example, the magnetic field of the permanent magnet can be modulated by adding a magnetic field generated by at least one coil. For example, alternating constant phases can be implemented by switching on or off, or by a general modulation of, a magnetic field generated by a coil. In this case, the magnetic field generated by the coil is weak enough so as not to substantially influence the remanent field of the permanent magnet.

Whether a magnet is a permanent magnet or a remanence magnet is thus decided based on the use thereof.

A magnetic inductive flow meter according to the invention that is configured to carry out the method according to any of the preceding claims thus comprises:

a measuring tube having a measuring tube axis, the measuring tube being configured to guide the medium;

a magnet system configured to generate a magnetic field perpendicular to the measuring tube axis;

at least one pair of measuring electrodes for tapping an electric measurement voltage induced by the magnetic field;

an electronic measuring/operating circuit configured to operate the magnet system and the measuring electrodes, and to carry out the method according to any of the preceding claims.

In one embodiment, the magnet system comprises at least one coil system having at least one coil, wherein the magnet system comprises, especially, at least one remanence magnet or, especially, at least one permanent magnet.

In one embodiment, the flow meter comprises a ground electrode;

BRIEF DESCRIPTION OF THE DRAWINGS

The invention will now be described with reference to exemplary embodiments.

DETAILED DESCRIPTION

Figure 1:
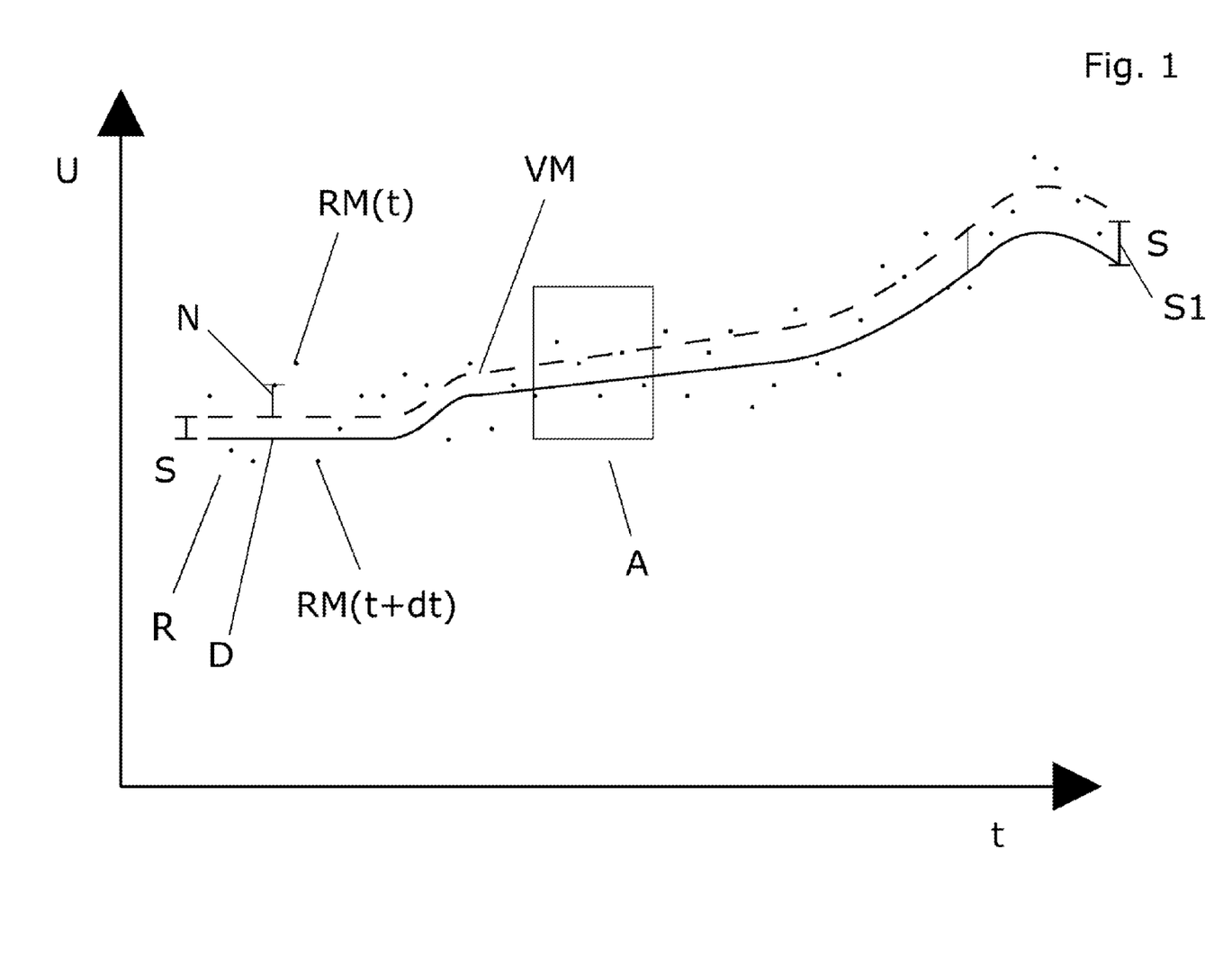
FIG. 1 shows an exemplary illustrated curve of measurement signals and processed signals.
Figure 7:
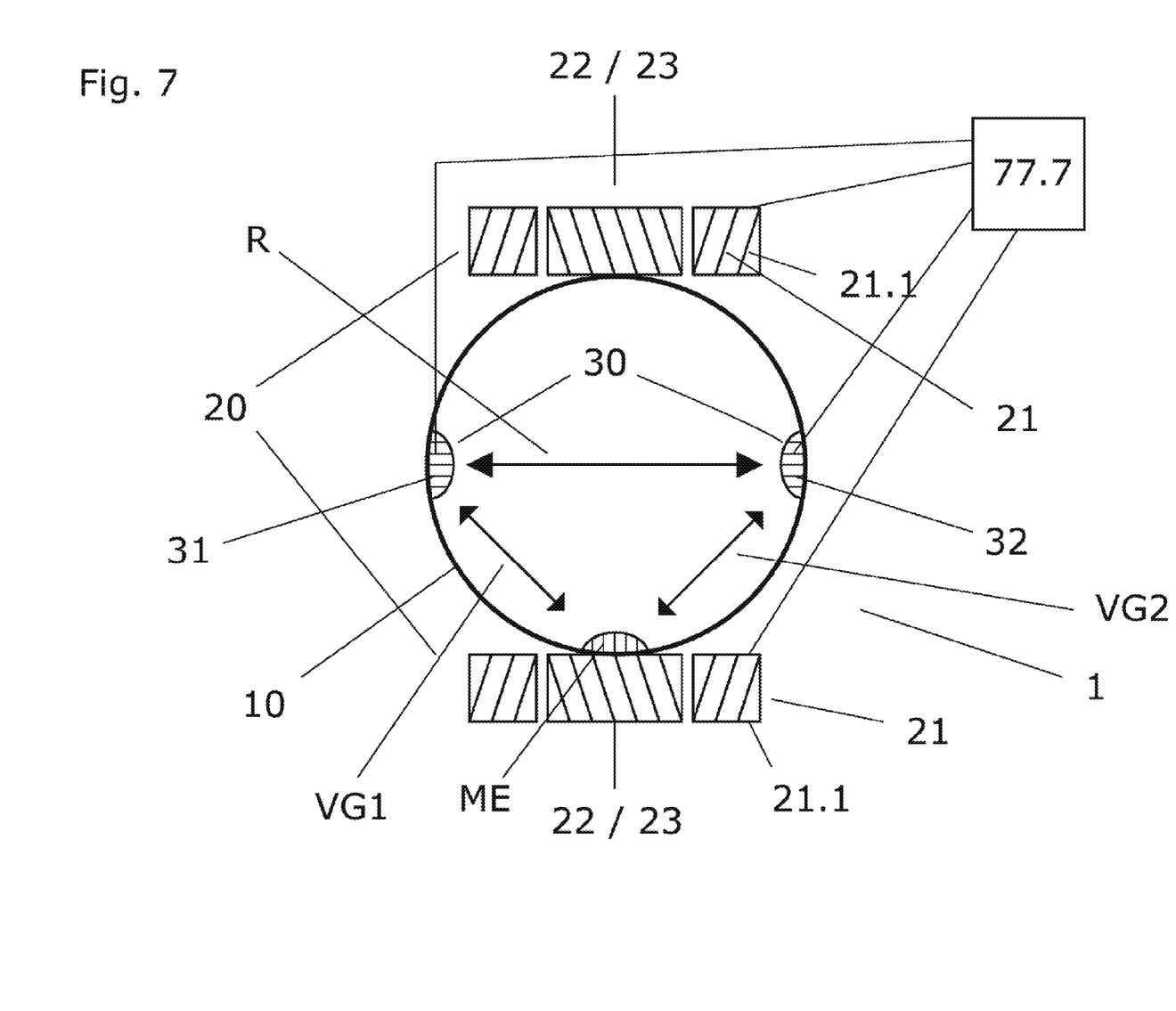
FIG. 7 illustrates a magnetic inductive flow meter.

FIG. 1 shows an exemplary curve of a raw measurement voltage R in a medium during a constant phase having a constant magnetic field, which is tapped by means of a pair of measuring electrodes 30 of a magnetic inductive measuring device 1, see FIG. 7. The raw measurement voltage R is composed of a flow-dependent component D, an interference component S, and signal noise N, wherein D is induced by the magnetic field acting on a measuring tube of the flow meter and by the flow of the medium in the medium. The interference component is produced by electrochemical processes taking place at the interface between the medium and the measuring electrode 31, 32 (see FIG. 7). The interference component exhibits temporal dynamics that occur significantly more slowly than typical flow fluctuations, so that these can be separated from one another by signal processing measures. The curve of the raw measurement voltage R is represented by arbitrary raw measurement voltage values RM(t), which are directly followed by subsequent raw measurement voltage values RM(t+dt). The measurement voltage curve thus comprises a flow-dependent component D, which is not exactly known, and an interference component S, which is not exactly known. During a constant phase K, a first flow measurement value D1 and a first interference voltage value S1 are each assigned to raw measurement voltages R during a constant phase K. By adding the first flow measurement values to associated first interference voltage values, a measurement voltage curve VM can be calculated, in which measurement voltage curve the signal noise N is at least partially suppressed.

Figure 2:
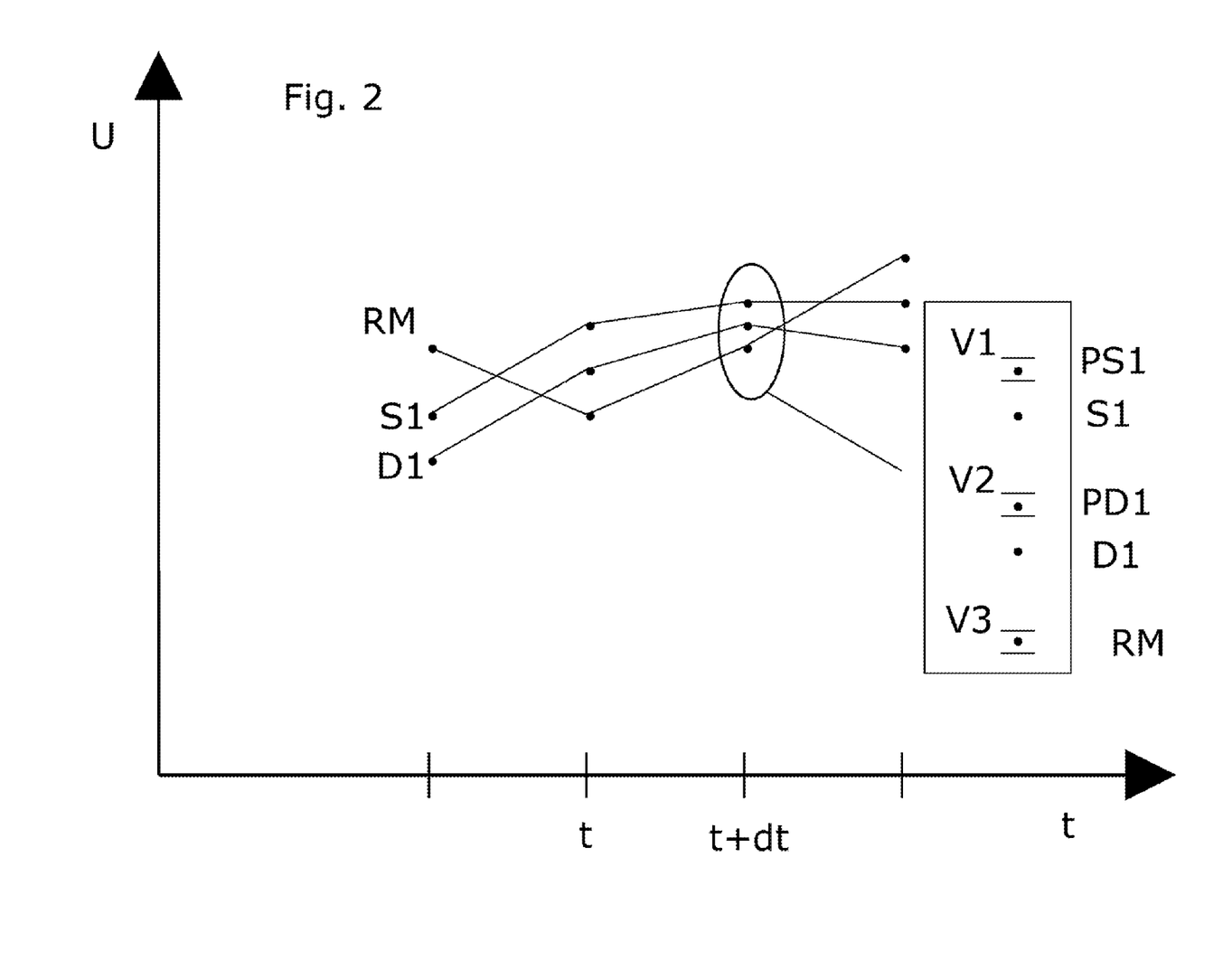
FIG. 2 shows a detail of the curves shown in FIG. 1 for describing calculation steps of the method according to the present disclosure.

FIG. 2 shows an exemplary enlarged detail of the curves shown in FIG. 1, wherein, proceeding from an arbitrary point in time t, the determination of directly following first flow measurement values D1 and first interference voltage values S1 is illustrated.

Proceeding from already calculated values D1 and S1 at the arbitrary point in time t, a respective value for the first flow measurement value and for the first interference voltage value are predicted for the subsequent point in time t+dt, which leads to a forecast value of the flow PD1($t$+dt) and a forecast value of the interference voltage PS1($t$+dt). A measurement value RM(t+dt) of the raw voltage R at the point in time t+dt is used to correct the forecast values, wherein uncertainties or variances of the forecast values and of the raw voltage measurement value RM can be used to determine a weighting of the individual values during the correction (see enlarged detail).

The forecasts are based on a mathematical model, wherein the forecast of the flow is subject to a first variance V1, and wherein the forecast of the interference voltage is subject to a second variance V2, the variances being calculated, for example, using the mathematical model, or estimated. However, the variances can also be determined based on a flow rate of the medium or can be assumed to be constant. Further criteria are, for example, a signal-to-noise ratio of the raw measurement voltage. The raw measurement value RM(t+dt) measured at the point in time t+dt has an uncertainty having a third variance V3. When calculating the forecast value PD1($t$+dt) or PS1($t$+dt) against the raw measurement value RM(t+dt), both values are weighted based on the variances thereof, for example. The mathematical model may be based on a Kalman filter, for example. By calculating the forecast value PD1 against the raw measurement value RM, a new first flow measurement value D1 (t+dt) is obtained for the point in time t+dt. Accordingly, a new first interference voltage value S1($t$+dt) is obtained by calculating the prediction value PS1 against the raw measurement value RM. By repeating the listed steps, the progression of the flow or the progression of the flow-dependent component of the raw measurement voltage R and the progression of the interference voltage can thus be determined during a constant phase.

If a deviation of a progression measurement value determined by the mathematical model from an interference value determined by the mathematical model exceeds a limit value, the magnet system can be prompted to switch from a present constant phase into a next phase.

Figure 3:
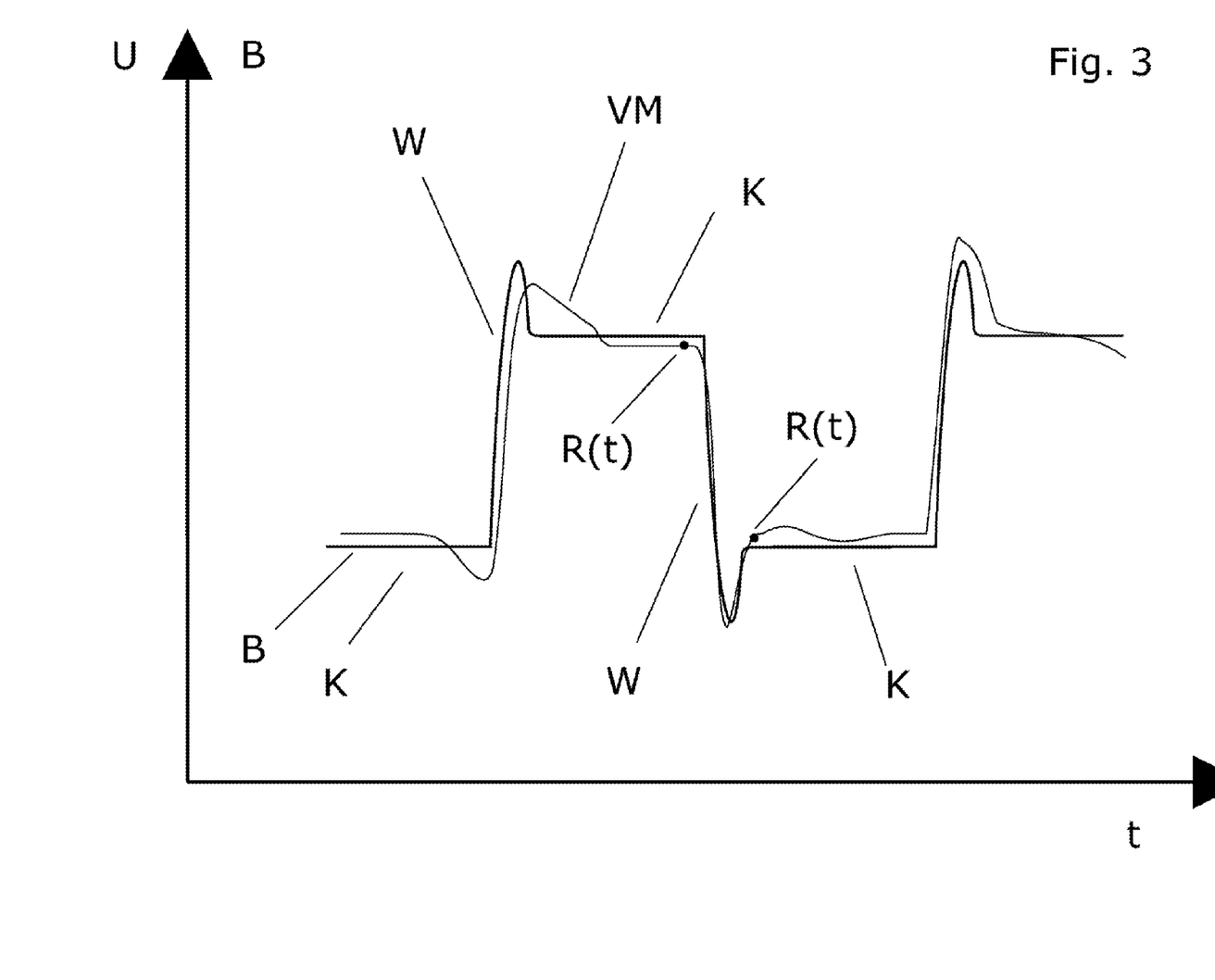
FIG. 3 illustrates an exemplary curve of a magnetic field and a measurement voltage curve over a plurality of constant phases.

FIG. 3 illustrates the progressions of a magnetic field B and of a raw voltage curve R over a plurality of constant phases K and alternating phases W, the medium being subjected to a constant magnetic field during the constant phases, and a change in the magnetic field being carried out during an alternating phase. The raw voltage curve R follows the changes in the magnetic field B, the modulation of the raw voltage curve R by the magnetic field being superimposed by changes in the flow and changes in the interference component. At the end of a constant phase and at the beginning of a subsequent constant phase, a respective raw voltage measurement value RM(t) is used, by forming the difference between the two values, to determine a second, verifying flow measurement value and a second, verifying interference voltage value, by means of which the mathematical model can be readjusted.

Figure 4:
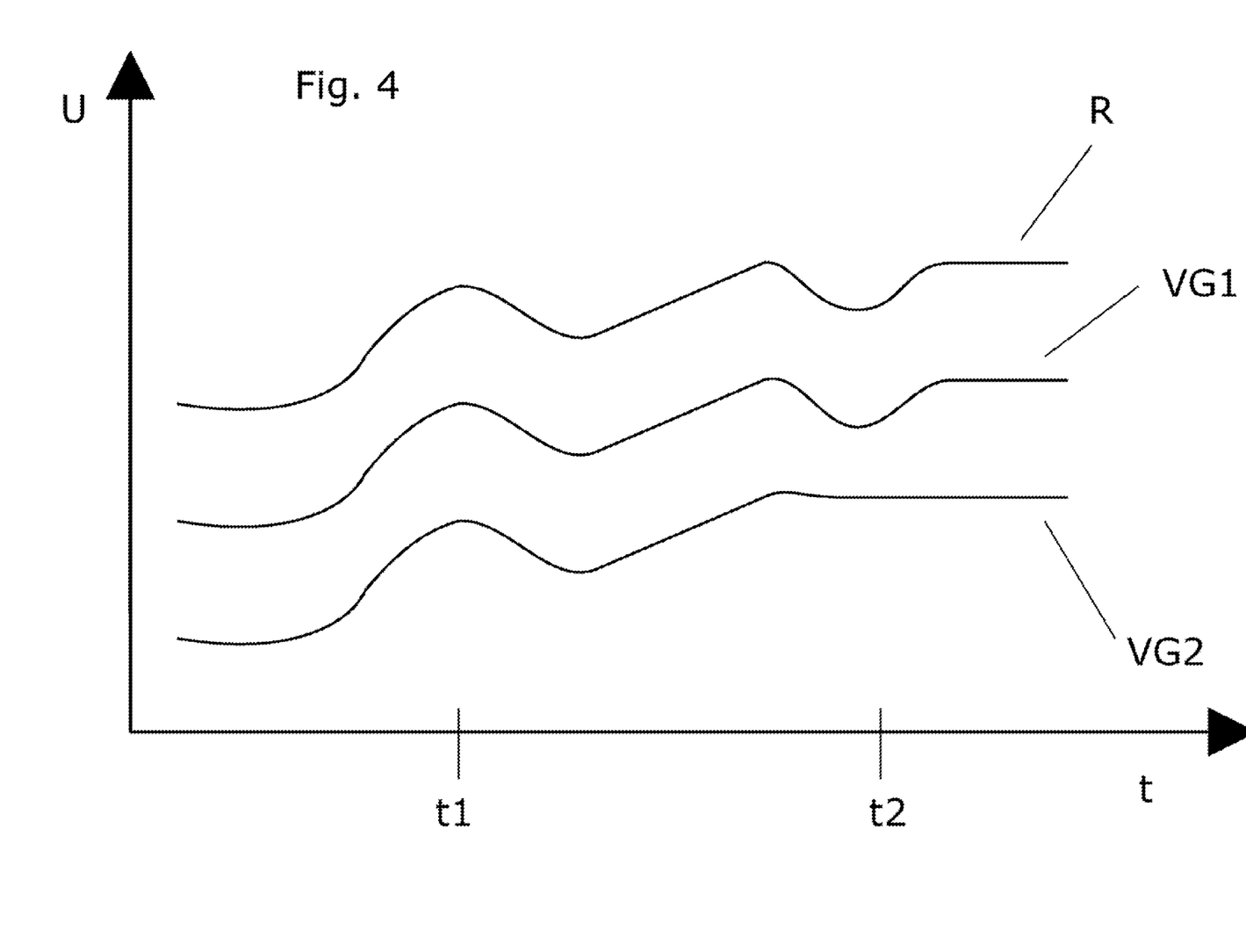
FIG. 4 illustrates exemplary curves of a measurement voltage progression and of a first comparison raw measurement voltage and a second comparison raw measurement voltage, which are tapped by means of a ground.

FIG. 4 describes an advantageous embodiment of the method based on a measurement voltage curve and the curves of a first comparison voltage VG1 and a second comparison voltage VG2, wherein the first comparison voltage is determined by determining a potential difference between the first measuring electrode 31 and a ground, or, especially, a ground electrode, and wherein the second comparison voltage is determined by determining a potential difference between the ground or ground electrode ME and the second measuring electrode 32.

If both comparison voltages follow the same course, as is shown at the point in time t1, a change in measurement voltage is identified as having been caused by a change in flow or a change in interference voltage. If there is a significant deviation between the first comparison voltage and the second comparison voltage, as is shown at the point in time t2, a change in measurement voltage is interpreted as a change in interference voltage.

Figure 5:
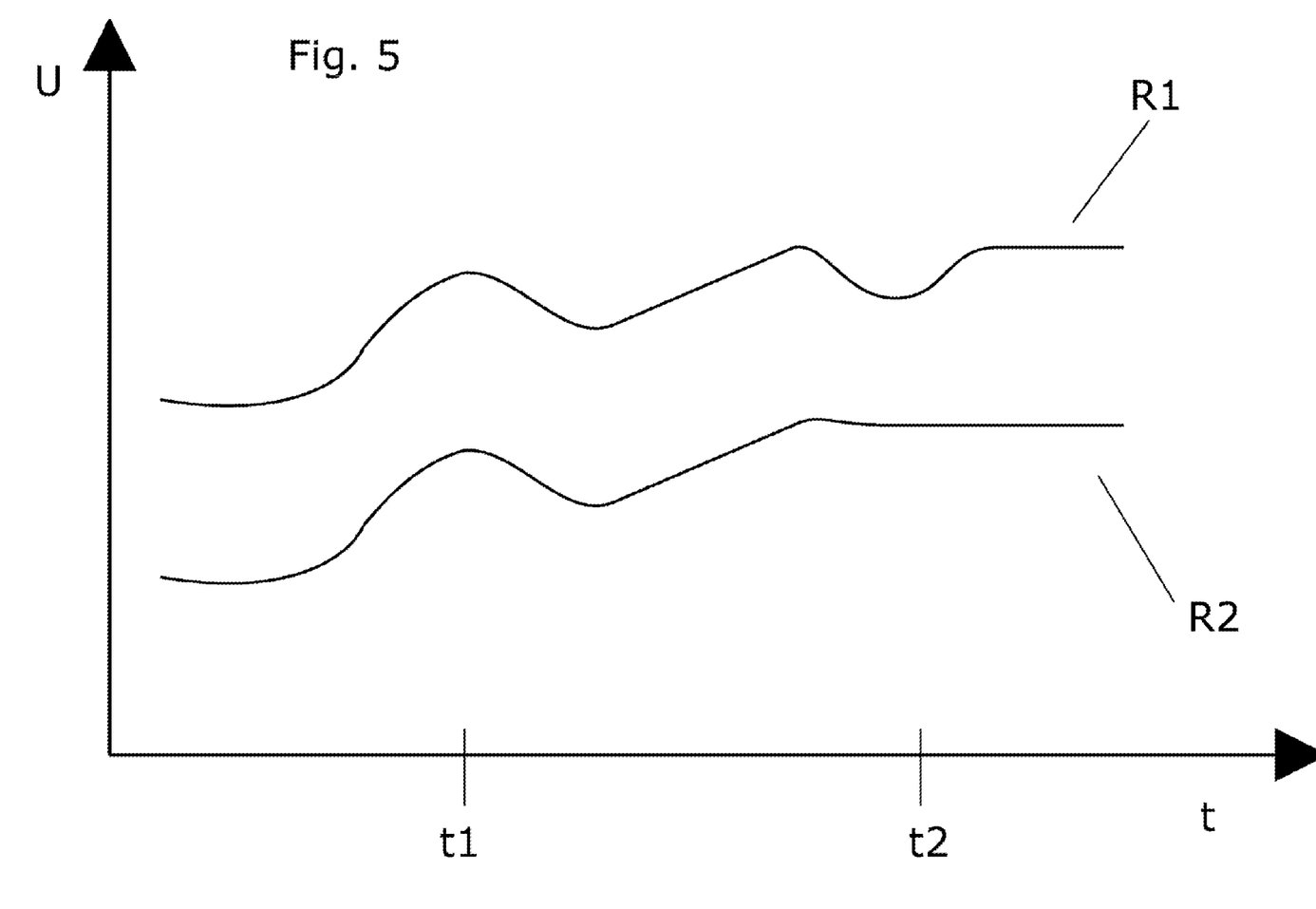
FIG. 5 illustrates exemplary curves of two raw measurement voltages, which are tapped by means of two measuring electrode pairs.

Alternatively or additionally, as shown in FIG. 5, it is also possible to tap two raw measurement voltages R1 and R2 by means of two measuring electrode pairs, and the curves of the two raw measurement voltages can be compared. A uniform progression of the two voltages, such as at the point in time t1, can be interpreted as a flow change, and a non-uniform progression can be interpreted as having been caused by an interference. In this way, a distinction can be made between a change in flow and an interfering influence, and additional information can be supplied to the mathematical model. This principle can also be extended to three or more measuring electrode pairs.

The comparison of the voltages shown in FIGS. 4 and 5 can be performed based on measured raw measurement voltages or first flow measurement values derived therefrom or second flow measurement values and/or first interference voltage values or second interference voltage values.

Figure 6:
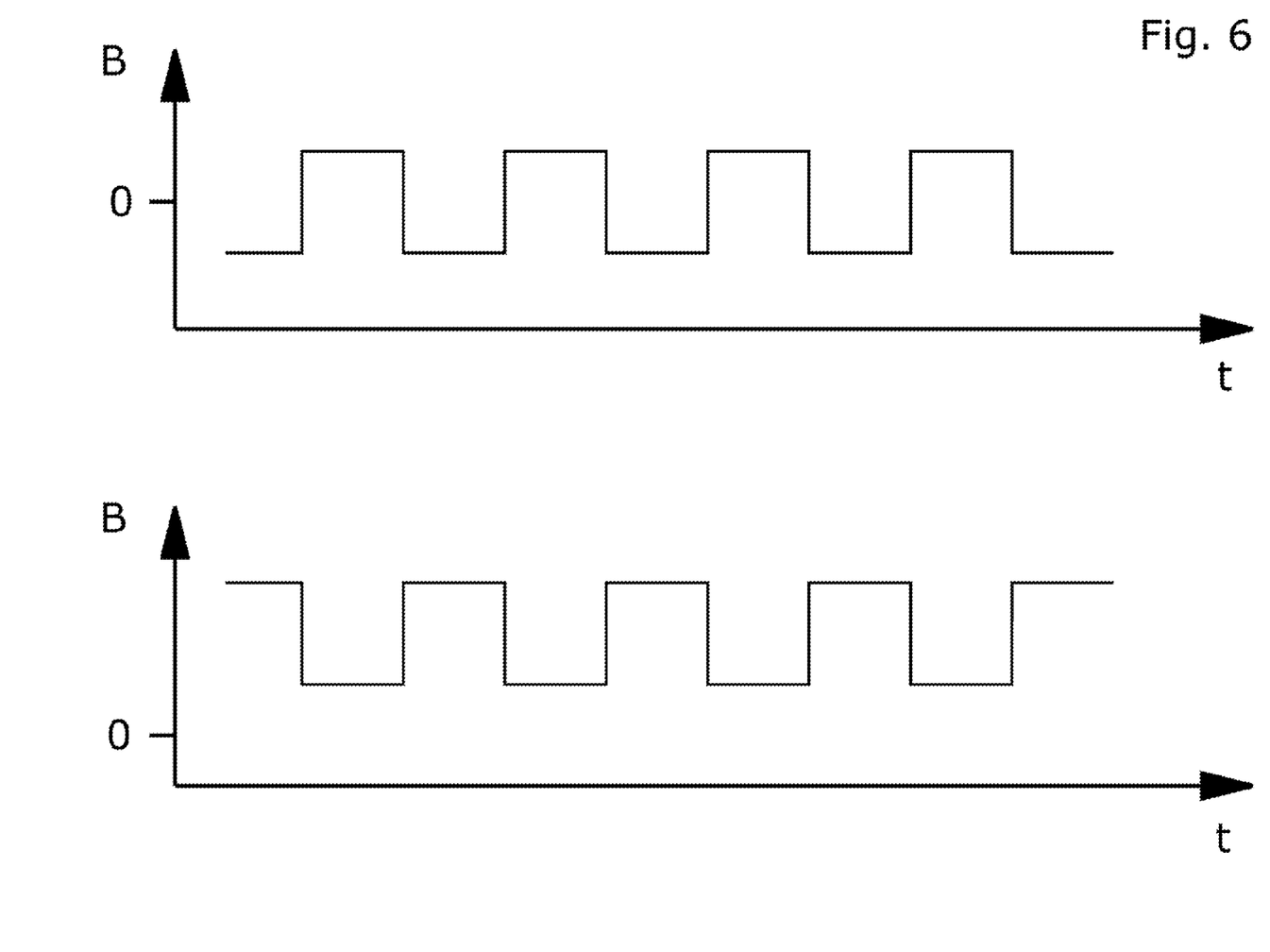
FIG. 6 illustrates exemplary magnetic field curves.

FIG. 6 illustrates schematic curves of magnetic fields, which can be generated using different magnet systems, wherein the upper curve can be produced, for example, by a magnet system comprising a coil system or by a magnet system comprising a coil system and at least one remanence magnet.

For example, the coil system can generate a magnetic field that oscillates around a zero point. Such a magnetic field can also be generated, for example, by changing the remanence or reversing the polarity of a remanence magnet by subjecting it to a magnetic pulse.

The magnetic field does not have to be symmetrical with respect to the zero point. The magnetic field curves shown in FIG. 6 are provided by way of example and should not be interpreted as being limiting.

The lower magnetic field curve illustrates a progression in which a basic magnetic field is generated by a permanent magnet, wherein an overall magnetic field is caused by modulation of the basic magnetic field by means of a coil system.

In contrast to the curves shown in FIG. 6, durations of successive constant phases may also differ. The durations of the curves shown in FIG. 6 are to be regarded as being provided by way of example and as non-limiting.

FIG. 7 illustrates a schematic design of a magnetic inductive flow meter 1 comprising a measuring tube 10 and a magnet system 20 comprising two coil systems 21, each including a coil 21.1 and two remanence magnets 22 or permanent magnets 23, each arranged in a coil system. The magnetic inductive flow meter 1 further comprises a pair of measuring electrodes 30, comprising a first measuring electrode 31 and a second measuring electrode 32, with which the raw measurement voltage R can be tapped. In addition, the flow meter comprises a ground electrode, by means of which a first comparison raw measurement voltage VG1 between the first measuring electrode 31 and the ground electrode ME 31 and a second comparison raw measurement voltage VG2 between the ground electrode and the second measuring electrode 32 can be tapped. An electronic measuring/operating circuit 77.7 of the flow meter is configured to operate the magnet system as well as the measuring electrodes and the ground, and to carry out the method according to the invention.

The invention claimed is:

1. A method for operating a magnetic inductive flow meter for measuring the volumetric flow or the flow rate of a medium flowing through a measuring tube of the flow meter, the method comprising:
providing a magnetic inductive flow meter comprising:
a magnet system configured to generate a magnetic field;
a measuring tube having a measuring tube axis;

at least one pair of measuring electrodes, including a first measuring electrode and a second measuring electrode; and an electronic measuring/operating circuit configured to evaluate raw measurement voltages and to determine flow measurement values, the measuring/operating circuit electrically connected to the at least one pair of measuring electrodes;

applying a magnetic field to a medium flowing thorough the measuring tube, the magnetic field perpendicular to the measuring tube axis;

generating a magnetic field curve having constant phases, during which the magnetic field is constant over time, and alternating phases during which the magnetic field is variable over time, the alternating phases configured to change from a first constant phase having a first magnetic field into a subsequent, second constant phase having a second magnetic field, the second magnetic field being dissimilar from the first magnetic field;

tapping a flow-dependent, electric raw measurement voltage induced in the medium by the magnetic field using the at least one pair of measuring electrodes;

determining a plurality of raw measurement values of the raw measurement voltage during each constant phase using the measuring/operating circuit, the raw measurement voltage comprising a flow-dependent component, an interference component and a noise component;

calculating from each raw measurement value a first flow measurement value and a first interference voltage value from each raw measurement value using the measuring/operating circuit;

calculating a second flow measurement value and a second interference voltage value of the interference component based on a raw measurement value of a preceding first constant phase and a raw measurement value of a second constant phase following the first constant phase using the measuring/operating circuit; and adapting the first flow measurement values of the first constant phase and/or second constant phase based on the second flow measurement value and the calculated second interference voltage value using the measuring/operating circuit.

2. The method of claim 1, further comprising:
predicting a subsequent forecast value of the flow based on the first flow measurement value;
predicting a subsequent forecast value of the interference voltage based on the first interference voltage value;
measuring a further raw measurement value;
calculating a first flow measurement value based on the forecast value of the flow and the further raw measurement value;
calculating a further first interference voltage value based on the forecast value of the interference voltage and the further raw measurement value; and
repeating the method to determine further first flow measurement values and further first interference voltage values.

3. The method of claim 2, wherein a weighting of the forecast values of the flow and of the interference voltage and of the raw measurement value are flow dependent.

4. The method of claim 2, wherein the predicting of the forecast values of the flow and of the interference voltage is based on linear or quadratic continuation or on Taylor expansion.

5. The method of claim 2, wherein a first variance is assigned to the forecast value of the flow, a second variance is assigned to the forecast value of the interference voltage, and a third variance is assigned to the raw measurement value, and wherein the calculating of the first flow measurement value or the first interference voltage value is based on the associated first, second and/or third variances using a weighting of the respective forecast value and of the raw measurement value.

6. The method of claim 5, wherein an estimation of each of the first, second and third variances is based on a difference between the corresponding forecast value of the flow or interference voltage and the raw measurement value or a signal-to-noise ratio.

7. The method of claim 5, wherein the occurrence of at least one of the following criteria prompts an alternating phase:
the first variance exceeds a first threshold;
the second variance exceeds a second threshold;
the third variance exceeds a third threshold; and
a deviation of a forecast interference component from a first interference value exceeds a fourth threshold value.

8. The method of claim 2, wherein a Kalman filter is used in the calculation of the forecast values of the flow and interference voltage and in the calculation of the first flow measurement value and of the first interference voltage value.

9. The method of claim 1, wherein:
at least two flow-dependent electric raw measurement voltages induced in the medium are tapped;
curves of the raw measurement voltages are compared;
a change in the raw measurement voltage is interpreted as interference when the raw measurement voltage curve changes in the absence of a corresponding change in the respective at least one other raw measurement voltage curve; and
a change in the raw measurement voltage is interpreted as a change in the flow when the raw measurement voltage curves are essentially constant.

10. The method of claim 9, wherein:
a first comparison voltage is tapped between the first measuring electrode and a ground and a second comparison voltage is tapped between the second measuring electrode and the ground;
the ground is a ground electrode or a pipe connected to the measuring tube or a grounding disk; and/or
a flow-dependent electric raw measurement voltage is tapped using at least two pairs of measuring electrodes.

11. The method of claim 9, wherein the comparing of the raw measurement voltages is performed based on the raw measurement voltages or first flow measurement values derived therefrom or second flow measurement values and/or first interference voltage values or second interference voltage values.

12. The method of claim 1, wherein at least two raw measurement values of the raw measurement voltage are determined during each constant phase.

13. The method of claim 1, wherein each raw measurement value is calculated by averaging a plurality of tapped raw measurement voltages, the averaging including at least two and/or no more than 100 tapped raw measurement voltages.

14. The method of claim 1, wherein:
the magnetic field is at least partially generated by at least one remanence magnet during the constant phases, and wherein, during the alternating phases, a remanent field of the remanence magnet is changed by reversing a polarity thereof using a coil system including at least one coil; or the magnetic field is at least partially generated by at least one permanent magnet or at least partially by a coil system, including at least one coil, during the constant phases, and wherein, during the alternating phases, the magnetic field is changed by changing the magnetic field component generated by the coil system; or the magnetic field is generated by a coil system including at least one coil.

15. A magnetic inductive flow meter configured for measuring the volumetric flow or the flow rate of a medium flowing through the flow meter, the flow meter comprising:
a measuring tube having a measuring tube axis and configured to guide the flowing medium therethrough;
a magnet system configured to generate a magnetic field perpendicular to the measuring tube axis;
at least one pair of measuring electrodes configured to tap an electric measurement voltage induced in the medium by the magnetic field; and
an electronic measuring/operating circuit electrically connected to the at least one pair of measuring electrodes and configured to operate the magnet system and the measuring electrodes, including:
applying the magnetic field to the flowing medium flowing;
generating a magnetic field curve having constant phases, during which the magnetic field is constant over time, and alternating phases during which the magnetic field is variable over time, the alternating phases configured to change from a first constant phase having a first magnetic field into a subsequent, second constant phase having a second magnetic field, the second magnetic field being dissimilar from the first magnetic field;
tapping a flow-dependent, electric raw measurement voltage induced in the medium by the magnetic field using the at least one pair of measuring electrodes;
determining a plurality of raw measurement values of the raw measurement voltage during each constant phase, the raw measurement voltage comprising a flow-dependent component, an interference component and a noise component;
calculating a first flow measurement value and a first interference voltage value from each raw measurement value;
calculating a second flow measurement value and a second interference voltage value of the interference component based on a raw measurement value of a preceding first constant phase and a raw measurement value of a second constant phase following the first constant phase; and
adapting the first flow measurement values of the first constant phase and/or second constant phase based on the second flow measurement value and the calculated second interference voltage value.

16. The flow meter of claim 15, wherein the magnet system comprises at least one coil system comprising at least one coil, the magnet system further comprising at least one remanence magnet or at least one permanent magnet.

17. The flow meter of claim 15, further comprising a ground electrode.

* * * * *